United States Patent
Wagner et al.

(10) Patent No.: US 8,375,554 B2
(45) Date of Patent: Feb. 19, 2013

(54) METHOD FOR JOINING COMPONENTS BY MEANS OF TENSIONING BOLTS

(75) Inventors: Paul-Heinz Wagner, Much-Birrenbachshöhe (DE); Bernd Thelen, Much (DE); Ulf Sittig, Nümbrecht (DE); Günter Andres, Much (DE)

(73) Assignee: Wagner Vermögensverwaltungs—GmbH & Co. KG, Much-Birrenbachshohe (DE)

( * ) Notice: Subject to any disclaimer, the term of this patent is extended or adjusted under 35 U.S.C. 154(b) by 600 days.

(21) Appl. No.: 12/525,441

(22) PCT Filed: Jan. 21, 2008

(86) PCT No.: PCT/EP2008/050649
§ 371 (c)(1), (2), (4) Date: Mar. 15, 2010

(87) PCT Pub. No.: WO2008/092768
PCT Pub. Date: Aug. 7, 2008

(65) Prior Publication Data
US 2010/0175240 A1  Jul. 15, 2010

(30) Foreign Application Priority Data
Feb. 2, 2007 (DE) ............ 10 2007 005 284

(51) Int. Cl.
B23P 11/00 (2006.01)
B23P 21/00 (2006.01)

(52) U.S. Cl. ............... 29/525.11; 29/705

(58) Field of Classification Search ......... 29/525.11, 29/525.05, 525.01, 505, 407.08, 407.05, 29/705, 707, 709, 240
See application file for complete search history.

(56) References Cited

U.S. PATENT DOCUMENTS

| | | | |
|---|---|---|---|
| 4,246,810 A | 1/1981 | Keske | |
| 4,829,650 A | 5/1989 | Galard | |
| 7,469,592 B2 | 12/2008 | Hohmann et al. | |
| 7,513,178 B2 | 4/2009 | Hohmann et al. | |
| 2004/0261583 A1 | 12/2004 | Hohmann et al. | |
| 2007/0266829 A1 | 11/2007 | Hohmann et al. | |

FOREIGN PATENT DOCUMENTS

| | | |
|---|---|---|
| DE | 3417173 | 11/1985 |
| DE | 42 38 922 | 11/1992 |
| DE | 101 45 847 | 9/2001 |
| DE | 102004043146 | 11/2005 |

(Continued)

OTHER PUBLICATIONS

English translation to the International Preliminary Report on Patentability for PCT/EP2008/050649 dated Oct. 15, 2009.

(Continued)

Primary Examiner — John C Hong
(74) Attorney, Agent, or Firm — Renner, Otto, Boisselle & Sklar, LLP

(57) ABSTRACT

A method for joining components using tensioning bolts, wherein the pressure is linearly increased over time when the tension bolt is hydraulically tensioned by means of a tensioning device. When a target value ($P_{max}$) is reached, the volume is blocked so that no more hydraulic oil is supplied. The pressure decreases when the components show a setting behaviour during a holding time ($t_H$). Pumping is resumed when a lower threshold value ($P_I$) is reached, resulting in a pressure increase up to the target value ($P_{max}$).

7 Claims, 5 Drawing Sheets

FOREIGN PATENT DOCUMENTS

Figure 1:
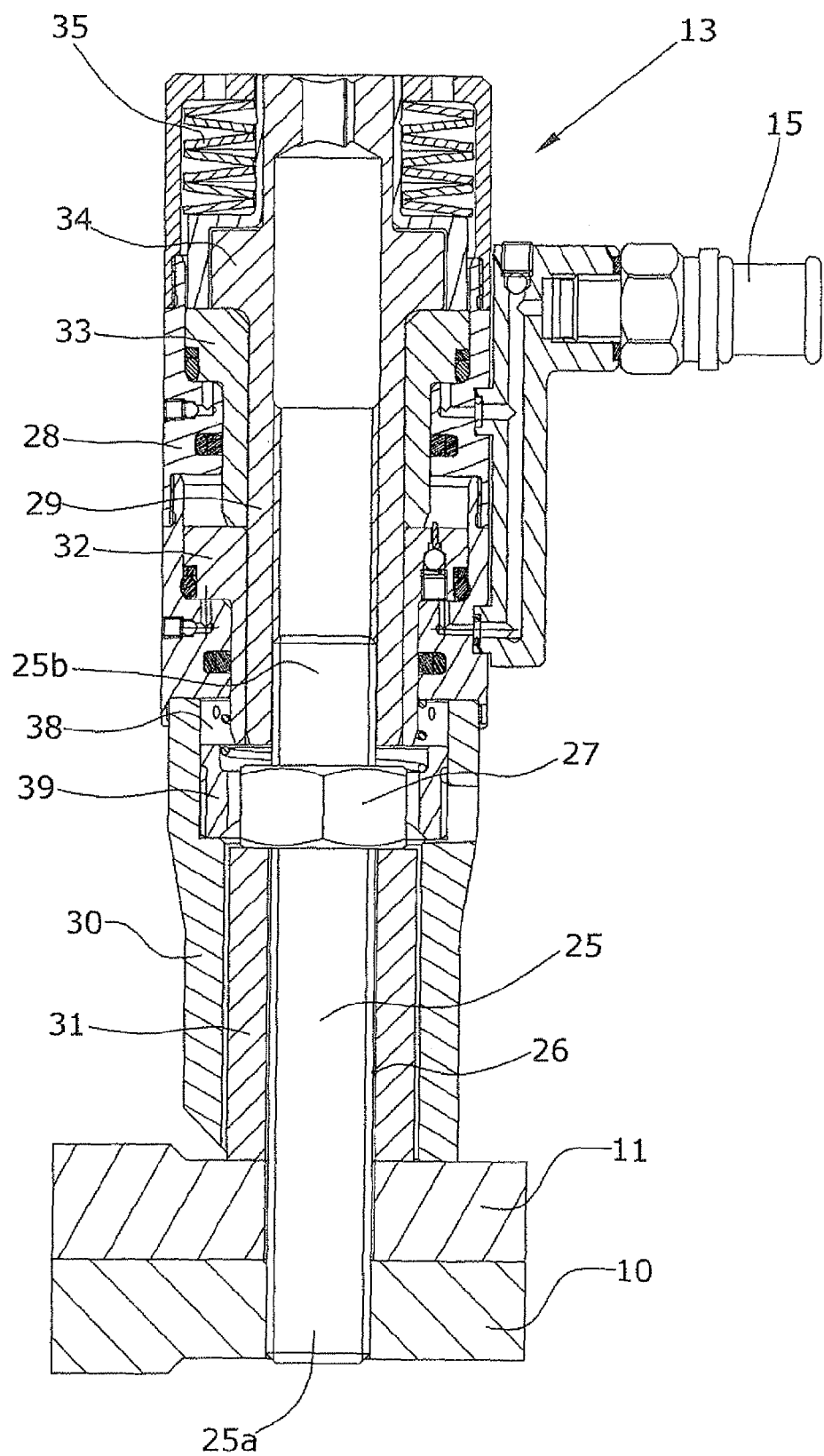

| | | |
|---|---|---|
| DE | 10 2005 015 922 | 10/2006 |
| WO | 82/00851 | 3/1982 |
| WO | 03/047811 | 6/2003 |
| WO | 2005/118225 | 12/2005 |
| WO | 2006/105931 | 10/2006 |

OTHER PUBLICATIONS

International Search Report for corresponding application No. PCT/EP2008/050649 completed Jul. 7, 2008.

METHOD FOR JOINING COMPONENTS BY MEANS OF TENSIONING BOLTS

The invention refers to a method for joining components by means of tensioning bolts, comprising the following steps:
placing a tensioning bolt at the components to be joined
threading a nut onto the tensioning bolt
stretching the tensioning bolt by means of a hydraulic tensioning device supported at the components, said tensioning device being in engagement with the protruding end of the tensioning bolt which extends beyond the nut, and
turning the nut further until it contacts one of the components.

Often components have to be joined using pre-tensioned tensioning bolts. This is the case, for instance, with reactor flanges or when fastening a component on a foundation. Usually, a tensioning bolt is stretched using a hydraulic tensioning device and a nut is threaded thereon while the stretched condition is maintained. The nut is turned further until it contacts one of the components to be joined.

However, such a method for generating and maintaining a pretension in a tensioning bolt is unsatisfactory, since the components to be joined show setting properties. If, after the stretching of the tensioning bolt, the nut is turned further prematurely, a part of the pretension is lost because of a subsequent setting of the components so that, eventually, the pretension force of the tensioning bolt is too low.

It is an object of the invention to provide a method for joining components by means of tensioning bolts that improves the maintenance of a desired pre-tension and largely eliminates the influence of setting properties.

The method of the present invention is defined by claim 1. According thereto, the hydraulic pressure of the tensioning device is monitored, the tensioning device is blocked hydraulically when a hydraulic pressure target value is reached during stretching, and, in the event of a pressure drop during the blocking, pressure is built up again by additional pumping.

The invention is based on the idea that the setting of the components to be screwed together should have come to an end, before the nut is turned further, i.e. prior to the largely effortless turning of the nut into contact with the component. To achieve this, the pressure development of the hydraulic tensioning device is monitored. During the tensioning operation, the pressure at the tensioning device builds up substantially linearly over time. Upon reaching a target value of pressure, the tensioning device is blocked. This means that the volume of the hydraulic chamber is maintained substantially constant and that no liquid is pumped, yet no liquid can escape either. If setting occurs in this condition, a part of the pre-tension is lost. Thereby, the oil-filled volume of the tensioning device becomes larger and the hydraulic pressure of the tensioning device decreases. If the pressure drops below a lower threshold, value, pressure is built up again until the target value is reached. In this manner, the unfavourable effects of the setting are eliminated. It is thus guaranteed that the tensile force of the tensioning device is induced into the tensioning bolt so that the joining properties of the components do not substantially impair the pre-tension obtainable. If the pressure is constant within a certain defined window and within a certain defined time, referred to as the holding time, a signal lamp is lit, indicating to the worker that the nut may now be threaded further. After this threading of the nut, the pressure is lowered and the tensioning device can be removed.

The logical development of the method depends on the individual steps. The starting condition for the performance of a successive work step is the termination of the previous work step. This prevents erroneous operations.

Within the provisions of the present method, an electronic recording or documentation may be performed as well. In a development of the invention, it is provided that an electronic recording of the following parameters is made:
 a) duration of the pressure build-up until the target value is reached,
 b) whether additional pumping has occurred.

In this manner, it can be recorded for each tensioning bolt how the assembly has been effected or whether anything extraordinary has occurred in the process. This could possibly be of importance as a future evidence that the tensioning screws have actually been assembled with the required pre-tension.

The lengthening of a tensioning bolt during a tensioning process can be determined by determining the volume of the hydraulic oil pumped into the tensioning device. Thus, the course of the piston in the tensioning cylinder of a hydraulic tensioning device can be calculated by the oil delivery volume using a microprocessor and pressure sensors.

The invention further refers to a device for joining components by means of tensioning bolts, comprising a hydraulic tensioning device having a tensioning cylinder, a hydraulic aggregate for generating the pressure for the tensioning device and a control device at which a target value of the pressure can be set.

According to the invention, the device is characterized in that the control device controls the hydraulic aggregate such that, after the target value has been reached, the same causes a blocking of the tensioning device for a predetermined holding time and that he control device reactivates the hydraulic aggregate if the pressure drops below a lower threshold value within the holding time.

Such a device may be used both for tensioning individual tensioning bolts and for a simultaneous tensioning of a group of tensioning bolts. The electronic control device guarantees that an exact generation or adjustment of the pre-tension is effected only after the termination of the setting.

The following is a detailed description of an embodiment of the invention with reference to the drawings.

Figure 2:
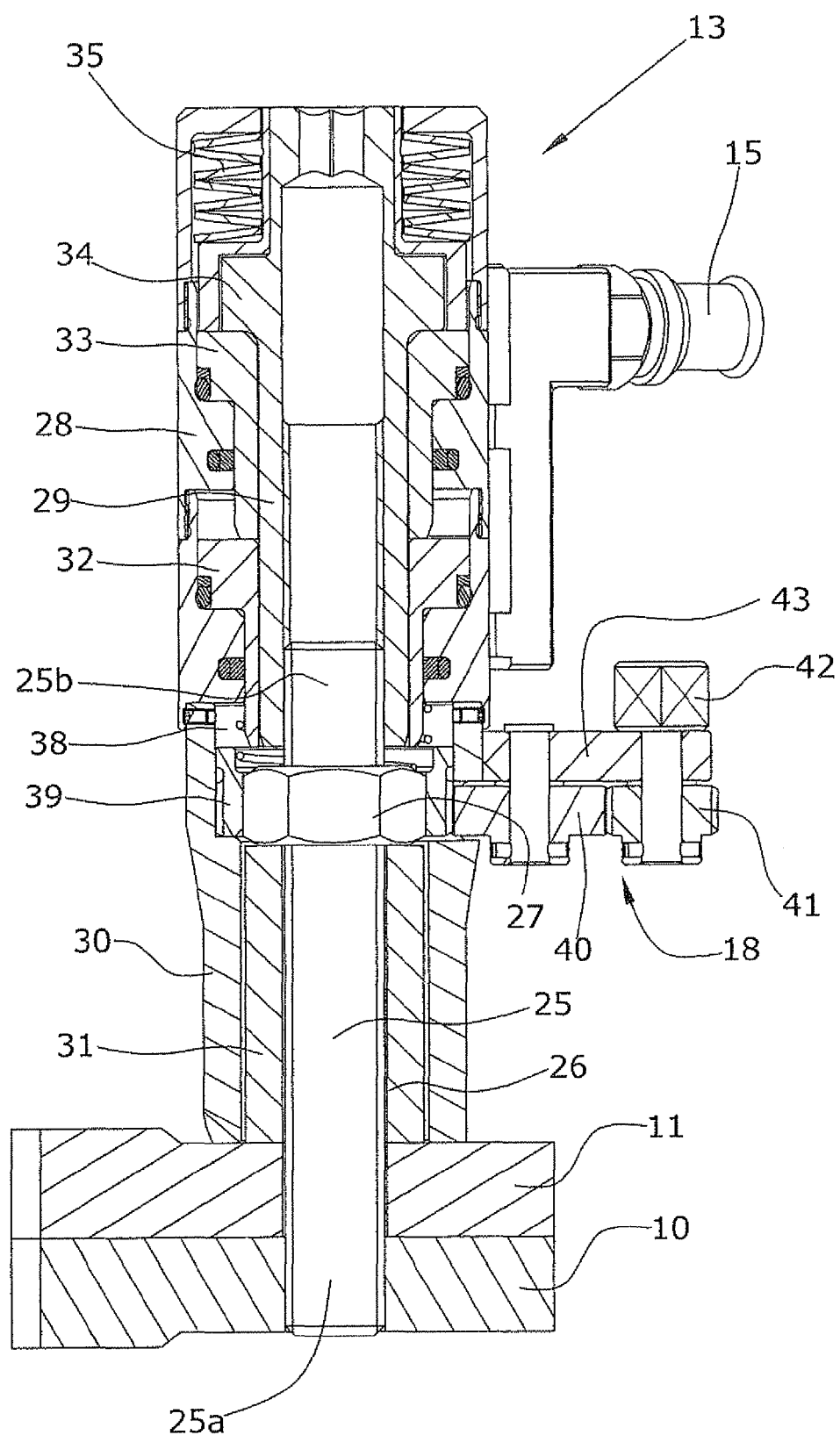
Figure 3:
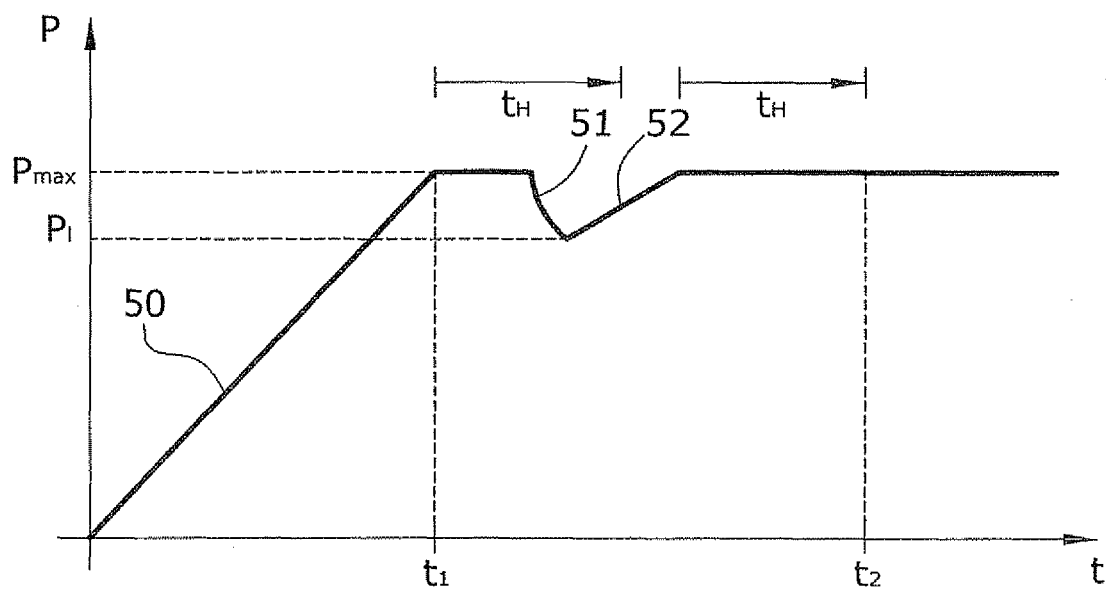
Figure 4:
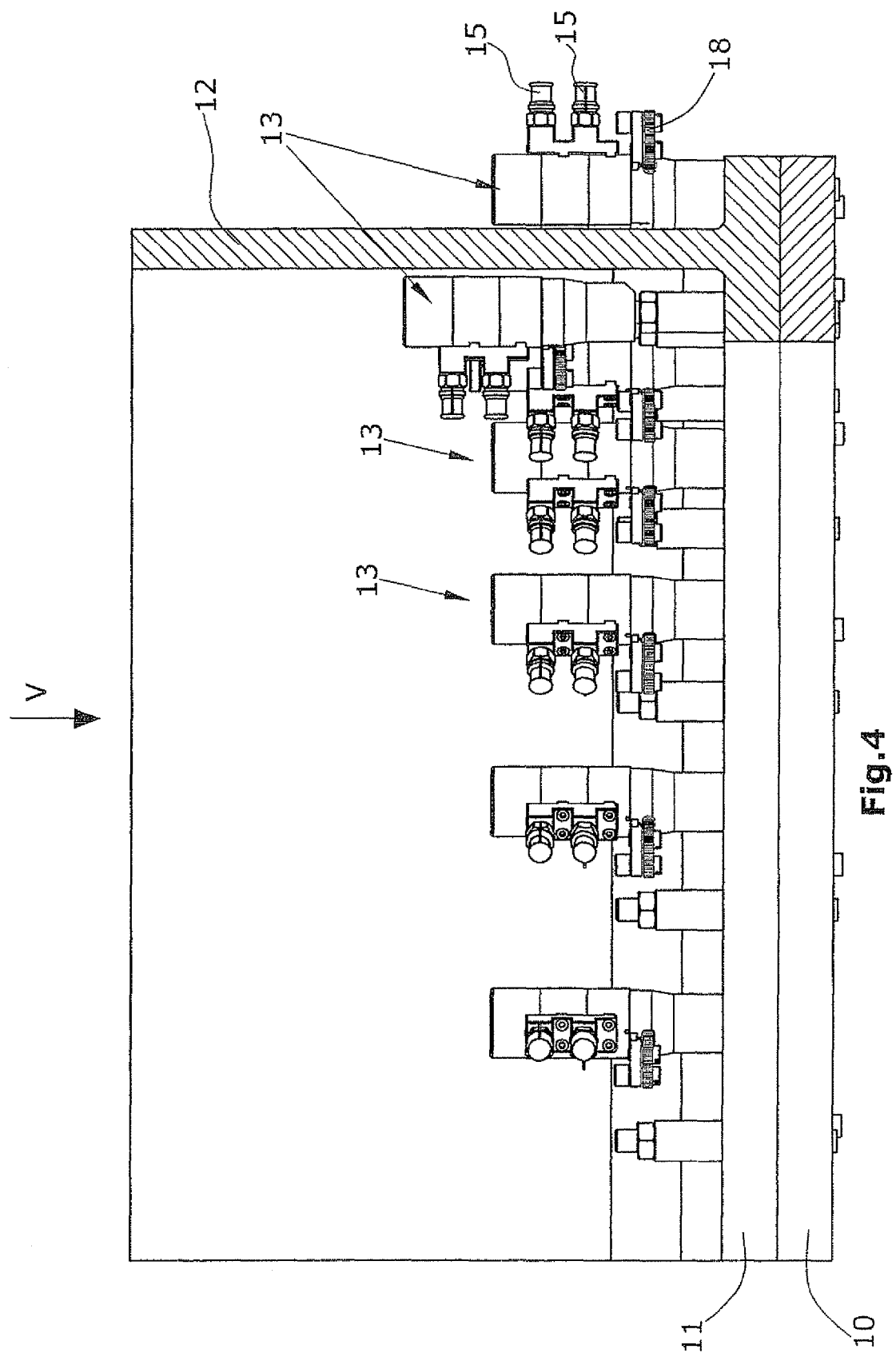
Figure 5:
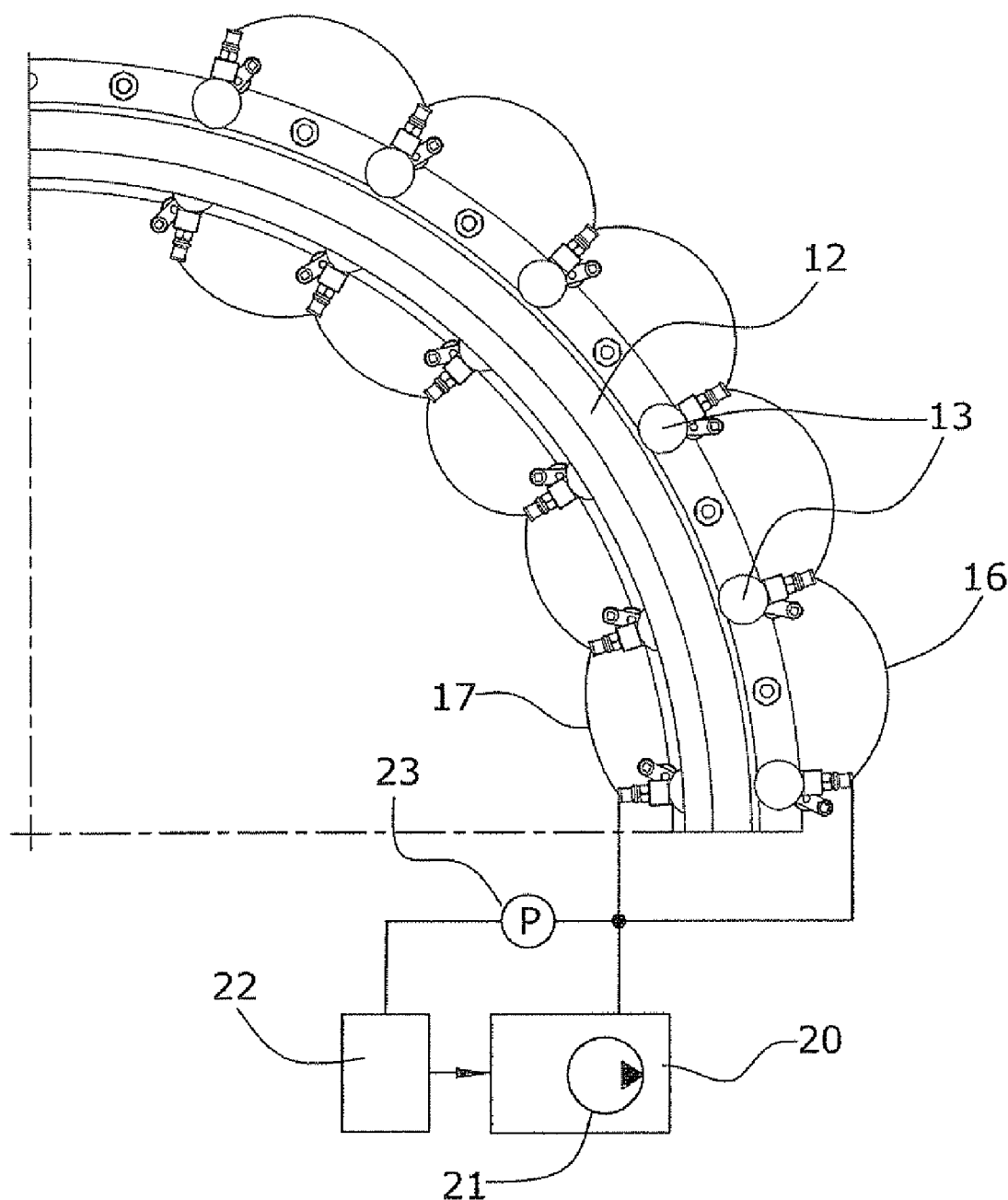

In the Figures:

FIG. 1 is a longitudinal section through a tensioning device for stretching a threaded bolt for the purpose of threading a nut thereon, FIG. 2 is another longitudinal section through the tensioning device of FIG. 1, FIG. 3 illustrates the chronological development of the pressure o he tensioning device during a tensioning operation, FIG. 4 illustrates the use of a plurality of tensioning devices operated and controlled by means of a pressure aggregate, and FIG. 5 is a top plan view on the arrangement illustrated in FIG. 3, seen from the direction of the arrow IV.

The tensioning device 13 illustrated in FIGS. 1 and 2 serves to join two components 10, 11 having abutting contact faces by means of a tensioning bolt 25, a nut 27 being threaded onto the thread 26 of the tensioning bolt 25. At one end 25*a*, the tensioning bolt 25 is connected with or supported on one of the components 10, whereas tensile stress is applied to the other end 25*b*. The tensioning device 13 has a housing 28 which includes a draw sleeve 29 threaded with a female thread onto the male thread of the rear end 25*b* of the threaded bolt. The housing 28 is supported on the component 11 by means of a sleeve 30. A spacer sleeve 31 extends through the sleeve 30 and surrounds the tensioning bolt 25. The nut 27 is turned against the rear end of the spacer sleeve 31. The spacer sleeve 31 absorbs the stretching force of the tensioning bolt 25 and is axially compressed between the nut 27 and the component 11.

Two hydraulic pistons 32, 33 act on the draw sleeve 29, which pistons are situated in corresponding cylinder chambers of the housing 28 and surround the draw sleeve 29. The pistons 32 and 33 press against a flange 34 of the draw sleeve 29, whereby a spring 35 arranged in the end portion of the housing 28 is compressed. The pistons 32, 33 are driven by means of hydraulic oil that is supplied through the hose connection 15. The hydraulic connections are pivotable about the longitudinal axis of the housing.

At the rear end the sleeve 30 comprises a receiving chamber 38 in which a ring gear 39 is arranged. The nut 27 is fittingly set into the ring gear 39 so that it is connected with the ring gear for co-rotation therewith. The ring gear 39 has a outer toothing meshing with a gear 40 (FIG. 2). The gear 40 in turn meshes with another gear 41 whose axis is connected with a polygonal head 42. The gears 40, 41 are rotatably supported on a cantilever arm 43 projecting radially from the sleeve 30. By applying a tool to the polygonal head 42, the ring gear 39 with the nut 27 can be rotated via the gears 40 and 41.

The tensioning device is used such that the tensioning bolt 25 is threaded into the outer component 10 and the inner component 11 is slipped over the threaded bolt. Then, the spacer sleeve 31 is slipped onto the threaded bolt and the nut 27 is tightened loosely. The tensioning device 13 is set on by slipping the sleeve 30 over the spacer sleeve 31. Then the draw sleeve 29 is rotated, thereby threading it onto the rear end 25b of the tensioning bolt 25. Now, the pistons 32, 33 are pressurized, whereby the tensioning bolt 25 is stretched. By turning the polygonal head 42, the nut 27 can be turned further by threading it until it contacts the rear end of the spacer sleeve 31. If the tensioning device is now relieved from pressure, the tensioning bolt 25 is stretched, and thus pretensioned, by the spacer sleeve 31.

FIG. 3 illustrates the development of the pressure P at the tensioning device in dependence on time t. When stretching the threaded bolt, the pressure P in a section 50 rises substantially linearly. This is due to the elasticity of the threaded bolt and the hoses leading from the pressure aggregate to the tensioning device. When the target value $P_{max}$ of the pressure is reached, the pressure system of the tensioning device is shut-off from the hydraulic aggregate. This means that no hydraulic oil is supplied to the consumer volume anymore and that no hydraulic oil can escape from there, either. At the time t1 of reaching the target value $P_{max}$, a holding time $t_H$ starts running in the control device, during which the blocked state is maintained. The development 51 in FIG. 2 indicates that a setting occurs during which the components move relative to each other. When the pressure P has fallen to a lower threshold value $P_I$, the hydraulic aggregate starts pumping again and a section 52 is formed in which the pressure again rises substantially linearly up to the target value $P_{max}$. After the target value has been reached another holding time $t_H$ starts running. The holding time has a predetermined constant value. If no more setting occurs within the second holding time, a signal for turning the nut is generated at the time $t_2$, after the lapse of the second holding time. This signal indicates to a worker that the nut may now be turned. If another setting occurs during the second holding time $t_H$ that does not last to the lower threshold value $P_I$, the respective pressure below $p_{max}$ is maintained. If, however, the pressure P falls below the lower threshold value $P_I$ during this new setting, another pumping-up is performed as in section 52.

FIGS. 4 and 5 show an example with a plurality of tensioning devices. Here, the components 10, 11 to be connected are flanges, one of which is connected with a housing wall 12. A part of the tensioning devices 13 is situated outside the housing wall 12, i.e. on the exterior of the housing, and another part of the tensioning devices is located on the interior. Each tensioning device 13 has a hose connection 15 connected with the hydraulic aggregate via a hose 16 or 17, respectively. The tensioning devices are connected with the hydraulic aggregate 20 in a parallel hydraulic connection.

The hydraulic aggregate 20 includes a pump 21 driven by a motor. The pump is a volumetric pump whose delivery rate is proportional to the rotational speed of the motor. The motor is controlled by a control device 22 connected with various sensors. One of these sensors is a pressure sensor 23 connected with the pressure line of the hydraulic aggregate. The pressure signal from the pressure sensor 23 is supplied to the control device 22 and the same controls the hydraulic aggregate 20 in accordance with the criteria explained in the context of FIG. 2.

The electronic control device 22 also includes a memory function to effect the above explained documentation of a tensioning process. Further, the control device has signal lights with which, among others, a signal for turning the nut can be produced. The nut is turned by moving a rotary drive 18 of the tensioning device 13.

The invention claimed is:

1. A method for joining components by means of tensioning bolts, comprising the following steps:
   placing a tensioning bolt at the components to be joined,
   threading a nut onto the tensioning bolt,
   stretching the tensioning bolt by pumping hydraulic oil into a hydraulic tensioning device supported at the components, said tensioning device being in engagement with a protruding end of the tensioning bolt which extends beyond the nut, and
   turning the nut further until it contacts one of the components,
   wherein hydraulic pressure of the tensioning device is monitored, the tensioning device is blocked hydraulically when a hydraulic pressure target value is reached during stretching, and building up the hydraulic pressure of the tensioning device by additional pumping if the hydraulic pressure drops below a lower threshold value when the tensioning device is being blocked hydraulically.

2. The method of claim 1, wherein a time measurement is started upon the tensioning device being blocked hydraulically, and that a signal for turning the nut is generated if no pressure drop below the lower threshold value occurs within a predetermined holding time after the time measurement is started.

3. The method of claim 1, wherein an electronic recording of the following parameters is performed:
   a) a duration of hydraulic pressure build-up until a target value is reached,
   b) a magnitude of the hydraulic pressure and/or a chronological development of the pressure, and
   c) whether additional pumping has occurred.

4. The method of claim 1, wherein lengthening of the tensioning bolt is determined by determining a volume of the hydraulic oil pumped into the tensioning device.

5. The method of claim 1, wherein the hydraulic tensioning device includes at least one piston movable in a tensioning cylinder, and that movement of the piston is calculated from the volume of delivered oil by a microprocessor and sensors.

6. A device for joining components by use of at least one tensioning bolt, comprising a hydraulic tensioning device having a tensioning cylinder, a hydraulic aggregate for generating pressure for the tensioning device, and a control device at which a target value of the pressure can be set, wherein the control device controls the hydraulic aggregate such that, after the target value has been reached, the control device causes a hydraulic blocking of the tensioning device for a predetermined holding time and that the control device reactivates the hydraulic aggregate if the pressure drops below a lower threshold value within the holding time.

7. The device of claim 6, wherein, if no pressure drop to below the lower threshold value occurs during the holding time, the control device generates a signal for turning a nut threaded on the tensioning bolt.

* * * * *

UNITED STATES PATENT AND TRADEMARK OFFICE
CERTIFICATE OF CORRECTION

PATENT NO. : 8,375,554 B2  Page 1 of 1
APPLICATION NO. : 12/525441
DATED : February 19, 2013
INVENTOR(S) : Wagner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 826 days.

Signed and Sealed this
First Day of September, 2015

Michelle K. Lee
*Director of the United States Patent and Trademark Office*